United States Patent [19]

Igarashi

[11] Patent Number: 4,969,261
[45] Date of Patent: Nov. 13, 1990

[54] METHOD OF ASSEMBLING CAM FOLLOWER DEVICE

[75] Inventor: Motohiro Igarashi, Atami, Japan

[73] Assignee: Nippon Seiko Kabushiki Kaisha, Tokyo, Japan

[21] Appl. No.: 405,552

[22] Filed: Sep. 11, 1989

[51] Int. Cl.⁵ ............................................. F16H 53/06
[52] U.S. Cl. .................................. 29/888.1; 29/512; 29/888.01; 74/569
[58] Field of Search ................ 29/888.1, 888.01, 444, 29/445, 509, 512, 521; 74/569; 123/90.2, 90.17, 90.21, 90.31, 90.44

[56] References Cited

U.S. PATENT DOCUMENTS

| | | | |
|---|---|---|---|
| 2,014,612 | 9/1935 | Borton | 74/569 |
| 2,081,390 | 5/1937 | Trapp | 74/569 |
| 2,291,564 | 7/1942 | Scott | 29/888.1 |

Primary Examiner—Howard N. Goldberg
Assistant Examiner—Irene Cuda
Attorney, Agent, or Firm—Hedman, Gibson, Costigan & Hoare

[57] ABSTRACT

A method for assembling a cam follower in a rocker arm of a valve drive mechanism comprises the steps of forming through the walls of the rocker arm a first through-hole which has an inner diameter slightly larger than the outer diameter of the cam follower shaft and a second through-hole which has an inner diameter slightly smaller than the outer diameter of the cam follower shaft, and inserting the shaft into the first through-hole and temporarily holding a tip end of the shaft with the second through-hole before permanently securing the shaft to the walls of the rocker arm by caulking.

12 Claims, 5 Drawing Sheets

METHOD OF ASSEMBLING CAM FOLLOWER DEVICE

BACKGROUND OF THE INVENTION

1. Field of the Invention

The present invention relates to a method for assembling a cam follower device, and, in particular, to a method for mounting a cam follower to a supporting member whereby no damage occurs to the outer peripheral surface of a shaft.

2. Description of the Prior Art

Conventionally, engines used to operate an automobile or the like have various configurations, but all reciprocating piston type engines, with the exception of some types of two-cycle engines, are provided with an air inlet valve and an exhaust valve which open and close in synchronism with the rotation of the crank shaft.

Various configurations exist for a valve drive mechanism for driving these air inlet and exhaust valves. An explanation will now be given with reference to the SOHC type shown in FIG. 1, as an example. An air inlet valve 4 and an exhaust valve 5 are driven in a reciprocating manner through a pair of rocker arms 3, 3 by means of one camshaft 2 rotating at one half the speed of a crankshaft 1 in the case of a four-cycle engine. The air inlet valve 4 and exhaust valve 5 are reciprocally driven through a mechanism that the ends of the rocker arms 3, 3 slide on the peripheral surfaces of a pair of cams 6, 6 which are secured to the cam shaft 2 which is rotating synchronously with the crankshaft 1.

In recent years, efforts have been made to reduce the friction between the ends of the rocker arms 3, 3 and the peripheral surfaces of the cams 6, 6 while the engine is operating, to reduce the fuel consumption during operation of the engine. For this reason, a cam follower which rotates in concert with the rotation of the cams 6, 6 has been provided at the part where the cams 6, 6 are engaged with the rocker arms 3, 3.

Specifically, as shown in FIG. 2 and FIG. 3, a pair of supporting walls 7, 7 is provided with a space therebetween at the end of the rocker arm 3 which faces the cam 6. Each end of a shaft 8 is supportingly secured to one of the respective supporting walls 7, 7. A rotatable member 10 in the form of a short cylinder is provided on the periphery of the shaft 8 through a plurality of rollers 9, 9. The outer peripheral surface of the rotatable member 10 and the outer peripheral surface of the cam 6 come into contact with each other, so that the rotatable member 10 rotates around the shaft 8 when the cam 6 rotates.

By the provision of the rotatable member 10 in this manner, the friction between the peripheral surface of the cam 6 and the end of the rocker arm 3 facing that peripheral surface is converted from sliding friction to rolling friction, reducing the fuel consumption.

For a cam follower device of this type to operate in a stable manner over a long period of time, it is necessary for the shaft 8 to be stably secured at the supporting walls 7, 7, so that the shaft 8 which supports the rotatable member 10 does not rotate with respect to the rocker arm 3. For this reason, the shaft 8 is conventionally supported at each end of one pair of supporting walls 7, 7, as shown in FIG. 3. A pair of through holes 11, 11 are formed in aligned positions in the pair of supporting walls 7, 7. The two ends of the shaft 8 are fitted into the through holes 11, 11. In addition, using a securing jig 12 as shown in FIG. 4 and FIG. 5, the two ends of the shaft 8 are secured by caulking to the inner peripheral surfaces of the through holes 11, 11, as shown in FIG. 6. This caulking secures the shaft 8 with respect to the supporting members 7, 7 formed with the through-holes 11, 11. A support rod 13 is provided to support the rocker arm 3 during the caulking operation, as shown in FIG. 6.

In the configuration outlined above, the shaft 8 must be installed between the two supporting walls 7, 7, in such a manner that the middle section of the external peripheral surface of the shaft 8 sustains no damage. The reason is that the middle section of the external peripheral surface of the shaft 8 acts as an external track for the contact of the rollers 9, 9. If this middle section of the external peripheral surface is damaged, the durability of the rolls 9, 9 is drastically curtailed.

For this reason, in the case of conventional methods for assembling a conventional cam follower device, for example, in the method disclosed in Japanese Laid Open Pat. No. Sho-63-133851, the inner diameter R of the through-holes 11, 11 formed in the supporting walls 7, 7, must be slightly larger than the outer diameter D of the shaft 8 ($D<R$). Therefore, when the shaft 8 is inserted into the through-holes 11, 11, there is no damage to the middle section of the external peripheral surface of the shaft 8.

However, when this type of cam follower device is being assembled, the positioning of the shaft with reference to the supporting walls 7, 7 can become uncertain. For this reason, it is difficult to determine if the shaft 8 is properly secured.

Specifically, even in the state where the two ends of the shaft 8 are positioned inside the through-holes 11, 11 of the supporting walls 7, 7, it is possible for the shaft 8 to be displaced with respect to the supporting walls 7, 7 (in the lateral direction in FIG. 6). On the other hand, the ends of the shaft 8 are only slightly deformed in depth (about 0.2 to 0.3 mm) by the action of the securing jig 12, 12. For this reason, even in the case where the shaft 8 has been slightly displaced from its true position with respect to the supporting walls 7, 7, the securing of the shaft 8 is unreliable.

SUMMARY OF THE INVENTION

An object of the present invention is to provide, with due consideration to the drawbacks of such conventional methods, a method for assembling a cam follower device wherein the securing of the shaft is reliably performed by a fact that the shaft is aligned with respect to the supporting walls before both ends of the shaft have been deformed by the securing jig.

This object is achieved in the method of the present invention for assembling a cam follower device, by making the inner diameter of a first through-hole formed in one of the pair of supporting walls slightly larger than the outer diameter of the shaft and making the inner diameter of a second through-hole formed in the other supporting wall slightly smaller than the outer diameter of the shaft.

To secure the shaft at both ends to the pair of supporting walls, the shaft is inserted from the first through-hole, and the leading tip end of the shaft is pressed into the second through-hole. This causes the shaft to be temporarily secured between the pair of supporting walls, so that the positional relationship of the shaft and the supporting walls does not vary.

When the shaft has been temporarily secured between the supporting walls, the securing jig is used to press the two ends of the shaft. This pressure causes the two ends of the shaft to be expanded outward at the outer periphery section so that each end of the shaft is fully secured to the respective supporting wall.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Now referring to FIG. 7 and FIG. 8, an embodiment of the present invention will be explained.

Figure 7:
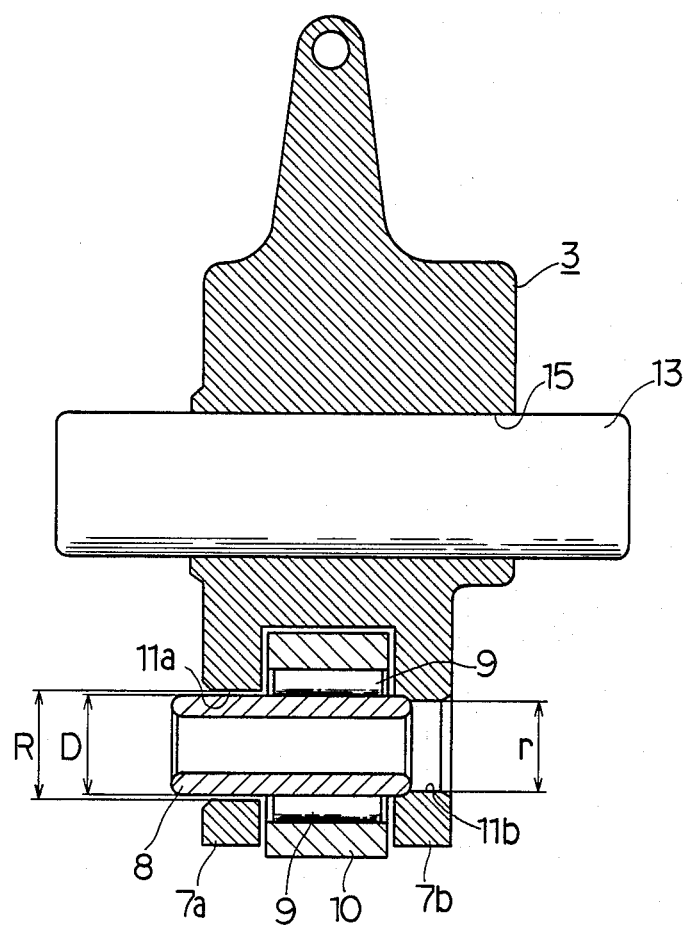
FIG. 7 is a sectional view showing a cam follower device wherein the shaft is secured by the assembly method in an embodiment of the present invention, specifically the first stage of assembling.
Figure 8:
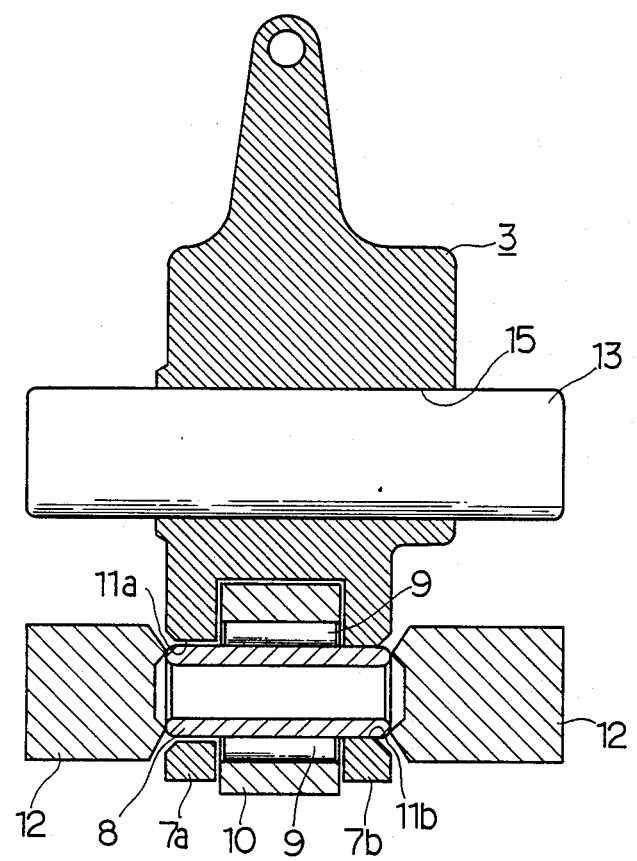
FIG. 8 is a sectional view showing the same cam follower device as in FIG. 7, specifically the second stage of assembling.

FIG. 7 and FIG. 8, a rocker arm 3 made of aluminum or copper is shown incorporated into the valve drive mechanism of an engine. On the end of the rocker arm 3 a pair of supporting walls 7a, 7b are formed, parallel to and separated from each other. A through-hole 11a and a through-hole 11b are provided in the respective supporting walls 7a, 7b, and the ends of a steel shaft 8 are received in the through-holes 11a, 11b for supporting. A cam follower device is comprised of a pair of steel rollers 9, 9 and a steel or ceramic rotatable member 10, which are supported by the ends of the steel shaft 8. The shaft 8 is made as a hollow tube to lighten its weight. The outer peripheral surface of the middle section of the shaft 8 is hardened by e.g. high frequency hardening to prevent wear from contact with the rollers 9, 9. The ends of the shaft 8 are not hardened, but are subject to free plastic deformation by the pressure from a securing jig 12, 12.

The inner diameter R of the first through-hole 11a formed in the supporting wall 7a on one side (to the left in FIGS. 7 & 8) is slightly larger than the outer diameter D of the shaft 8 ($R > D$). In addition, the inner diameter r of the second through-hole 11b formed in the supporting wall 7b on the other side (to the right in FIGS. 7 & 8) is slightly smaller than the outer diameter D of the shaft 8 ($r < D$).

Figure 1:
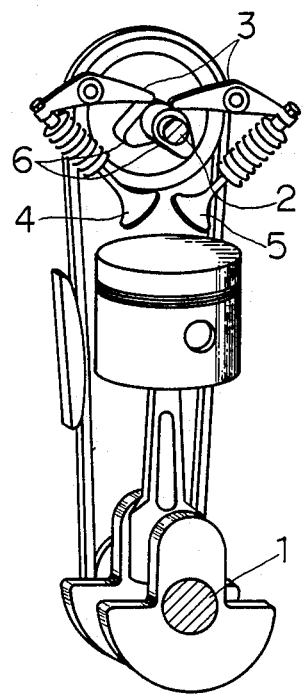
FIG. 1 is a perspective view showing an example of the conventional valve operating mechanism of an engine.
Figure 2:
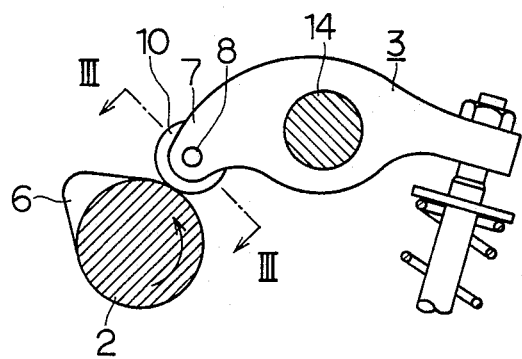
FIG. 2 is a side elevational view of a cam follower device assembled on the valve operating mechanism of FIG. 1.
Figure 6:
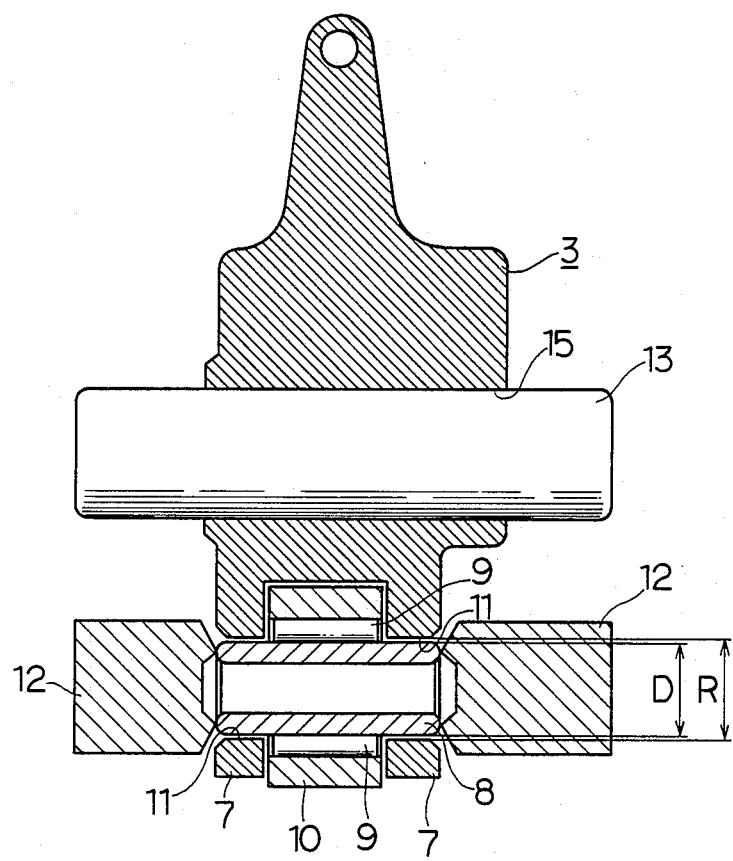
FIG. 6 is a sectional view showing a cam follower device wherein the shaft is secured by a conventional assembly method.

In the middle section of the rocker arm 3, a through-hole 15 is formed for insertion of a pivotable shaft 14 as shown in FIG. 2. When the cam follower device is being assembled, a supporting rod 13 is inserted through the through-hole 15 in a similar manner as in FIG. 6.

When the two ends of the shaft 8 are secured between the supporting walls 7a, 7b, the shaft 8 is inserted, as shown in FIG. 7, from the side on which the first through-hole 11a is formed, then the leading tip end of the shaft 8 (the right end in FIGS. 7 & 8) is pressed into the inside of the second through-hole 11b. The rollers 9, 9 and the rotatable member 10 are inserted in a prescribed position between the supporting walls 7a, 7b prior to the insertion of the shaft 8. The above-mentioned pressing operation is carried out until the proper positional relationship between the shaft 8 and the supporting walls 7a, 7b is achieved. Under the state where the positional relationship between the shaft 8 and the supporting walls 7a, 7b is thus controlled, the shaft 8 is temporarily secured between the supporting walls 7a, 7b from the frictional force between the outer peripheral surface of the leading tip end of the shaft 8 and the inner peripheral surface of the second through-hole 11b. Accordingly, there is no deviation in the positional relationship between the shaft 8 and the supporting walls 7a, 7b.

Figure 3:
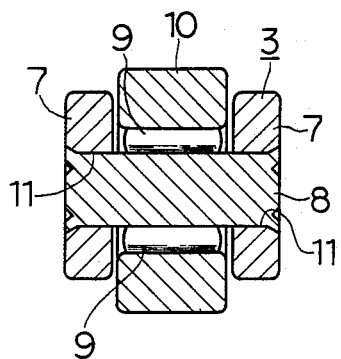
FIG. 3 is a sectional view taken along the line III—III of FIG. 2.
Figure 4:
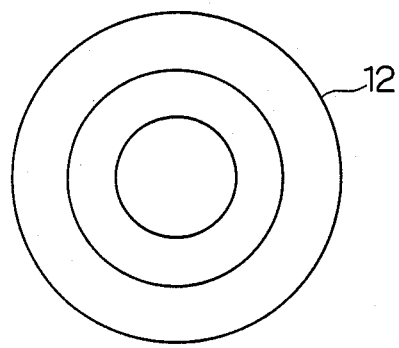
FIG. 4 is an end elevational view of a securing jig used in assembling the cam follwer device of FIG. 2.
Figure 5:
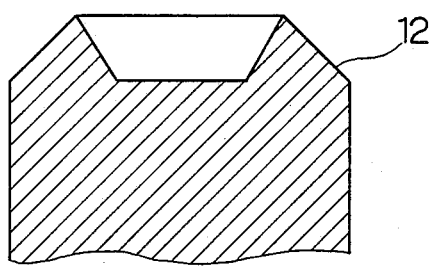
FIG. 5 is a sectional view of the securing jig of FIG. 4.

After the shaft 8 is temporarily secured between the supporting walls 7a, 7b, the tip of the securing jig 12, 12 is pressed against the both end surfaces of the shaft 8 as shown in FIG. 8. As a result of this action, the outer peripheral part of the shaft 8 at both ends expands outward as shown in FIG. 3. Both ends of the shaft 8 are thus firmly secured by the supporting walls 7a, 7b, completing the assembly of the cam follower device.

In the method of the present invention for assembling a cam follower device as outlined above, because the shaft 8 is inserted from the side of the first through-hole 11a with the large diameter, no damage occurs to the outer peripheral surface of the middle section of the shaft 8. Accordingly, the roller 9, 9 for supporting the rotatable member 10 in a freely rotatable manner contacts with no flaw on the outer peripheral surface of the shaft 8, therefore there is no impediment to the reliability of the roller 9, 9. At the same time, when the shaft 8 passes through the first through-hole 11a, no fine shaving adheres to the outer peripheral surface of the middle section of the shaft 8. Therefore, the roller 9, 9 does not come in contact with any fine shaving, so that the durability of the roller 9, 9 is increased.

Also, after the leading tip end of the shaft 8 is inserted into the inside of the second through-hole 11b, there is no deviation in the positional relationship between the shaft 8 and the supporting walls 7a, 7b because of the frictional force between the outer peripheral surface of the leading tip end of the shaft 8 and the inner peripheral surface of the second through-hole 11b. In other words, before the securing jig 12, 12 is pressed against the both end surfaces of the shaft 8, the shaft 8 is placed in a state where it cannot move. Therefore, when the both ends of the shaft 8 are expanded outward by the securing jig 12, 12, the outer peripheral edges of the part that is expanded are reliably pressed against the outer peripheral surfaces of the first and second through-holes 11a, 11b. Accordingly, the shaft 8 is reliably secured to the supporting members 7, 7.

The part on which the cam follower device is provided for the valve drive mechanism of an engine does not have to be at the end section of a rocker arm as shown in the drawings. It could also be at the middle section of the rocker arm, the edge of the base of the valve, the edge of the base of the push rod, or the like. These differences result from the differences in the type of engines, such as the SV type, the OHV type, the DOHC type, and the like.

What is claimed is:

1. A method for assembling a cam follower device which comprises first and second supporting walls provided with a space therebetween, a shaft having an outer peripheral surface with an outer diameter and first and second tip ends and supported at said first and second tip ends by said supporting walls, a plurality of rollers provided around said shaft, such that said plurality of rollers contact to said outer peripheral surface of said shaft, and a rotatable member supported in a freely rotatable manner around said shaft with said plurality of rollers therebetween; comprising the steps of:

(a) forming through said first supporting wall a first through-hole which has an inner diameter slightly larger than said outer diameter of said shaft and forming through said second supporting wall a second through-hole which has an inner diameter slightly smaller than said outer diameter of said shaft;

(b) inserting said shaft from outside into said first through-hole and through said plurality of rollers and pressing said shaft at said second tip end into said second through-hole; and (c) keeping said second tip end of said shaft pressed into said second through-hole and pressing a securing jig having a tip section against said shaft, such that said tip section is pressed against said first and second tip ends of said shaft to radially expand said first and second tip ends at an outer peripheral part thereof, so that said first and second tip ends of said shaft are secured into said first and second through-holes; whereby any flaw is prevented from occurring on said outer peripheral surface of said shaft upon inserting said shaft, while any fine shaving is prevented from adhering to said outer peripheral surface of said shaft, and displacement of said shaft with respect to said first and second supporting walls is prevented before said first and second tip ends of said shaft are radially expanded by said securing jig.

2. The method of claim 1, wherein said cam follower device is used for a valve drive mechanism having a rocker arm, and said first and second supporting walls are provided on said rocker arm at a tip section thereof.

3. The method of claim 1, wherein said cam follower device is used for a valve drive mechanism having a rocker arm, and said first and second supporting walls are provided on said rocker arm at a middle section thereof.

4. The method of claim 1, wherein said cam follower device is used for a drive mechanism for a valve, and said first and second supporting walls are provided on said valve at a base edge section thereof.

5. The method of claim 1, wherein said cam follower device is used for a valve drive mechanism having a push rod, and said first and second supporting walls are provided on said push rod at a base edge section thereof.

6. The method of claim 1, wherein said shaft is a hollow tube.

7. The method of claim 2, wherein said shaft is a hollow tube.

8. The method of claim 3, wherein said shaft is a hollow tube.

9. The method of claim 4, wherein said shaft is a hollow tube.

10. The method of claim 5, wherein said shaft is a hollow tube.

11. A method for mounting a cam follower in a rocker arm having a pair of supporting members in a valve drive mechanism, said cam follower having a shaft with an outer diameter, comprising the steps of forming through said pair of supporting members of said rocker arm a first through-hole which has an inner diameter slightly larger than said outer diameter of said cam follower shaft and a second through-hole which has an inner diameter slightly smaller than said outer diameter of said cam follower shaft, and inserting said cam follower shaft into said first through-hole and temporarily holding said cam follower shaft at a tip end thereof with said second through-hole before permanently securing said cam follower shaft to said supporting members of said rocker arm.

12. A method of claim 11, wherein said cam follower shaft is permanently secured to said supporting members of said rocker arm by caulking.

* * * * *